United States Patent
Wu

(10) Patent No.: US 11,237,048 B2
(45) Date of Patent: Feb. 1, 2022

(54) LIGHT SENSOR WITH A HIGH SENSITIVITY USING A SIGMA-DELTA ANALOG TO DIGITAL CONVERTER AND SENSING METHOD THEREOF

(71) Applicant: EMINENT ELECTRONIC TECHNOLOGY CORP. LTD., Hsin-Chu (TW)

(72) Inventor: Kao-Pin Wu, New Taipei (TW)

(73) Assignee: Eminent Electronic Technology Corp. Ltd., Hsin-Chu (TW)

( * ) Notice: Subject to any disclaimer, the term of this patent is extended or adjusted under 35 U.S.C. 154(b) by 0 days.

(21) Appl. No.: 17/033,291

(22) Filed: Sep. 25, 2020

(65) Prior Publication Data
US 2021/0164834 A1   Jun. 3, 2021

Related U.S. Application Data

(60) Provisional application No. 62/942,749, filed on Dec. 3, 2019.

(30) Foreign Application Priority Data

Jul. 20, 2020 (TW) .................. 109124383

(51) Int. Cl.
| G01J 1/46 | (2006.01) |
| G01J 1/42 | (2006.01) |
| G01J 1/44 | (2006.01) |
| G01J 1/02 | (2006.01) |

(52) U.S. Cl.
CPC ............... *G01J 1/46* (2013.01); *G01J 1/0233* (2013.01); *G01J 1/4204* (2013.01); *G01J 1/44* (2013.01); *G01J 2001/444* (2013.01); *G01J 2001/446* (2013.01)

(58) Field of Classification Search
CPC ...... G01J 1/46; G01J 1/4204; G01J 2001/444; G01J 2001/446; G01J 1/44; G01J 1/0233
See application file for complete search history.

(56) References Cited

U.S. PATENT DOCUMENTS

| 6,452,666 B1 * | 9/2002 | Barna ...................... G01C 3/08 356/5.01 |
| 8,300,116 B2 * | 10/2012 | Kwon .................... H04N 5/378 348/222.1 |
| 2013/0003079 A1 * | 1/2013 | Holcombe .............. G01S 17/04 356/614 |

(Continued)

FOREIGN PATENT DOCUMENTS

| CN | 101285975 A | 10/2008 |
| DE | 102014105880 A1 * | 10/2014 ............ H03M 3/452 |

(Continued)

*Primary Examiner* — Jennifer D Bennett
(74) *Attorney, Agent, or Firm* — Muncy, Geissler, Olds & Lowe, P.C.

(57) ABSTRACT

A light sensor includes a light sensing element, a first integrator and a sigma-delta analog-to-digital converter. The light sensing element senses light during a measurement period to generate a first current. The first integrator is coupled to the light sensing element and configured to receive the first current and generates a first integration signal. The sigma-delta analog-to-digital converter is coupled to the first integrator and used to convert the first integration signal to a sensing value.

10 Claims, 4 Drawing Sheets

(56) References Cited

U.S. PATENT DOCUMENTS

2016/0141327 A1* 5/2016 Verdant ................ H03M 3/394
                                                    250/208.1

FOREIGN PATENT DOCUMENTS

| EP | 0458524 A2 | 11/1991 |
|---|---|---|
| TW | 200949397 A | 12/2009 |
| TW | 201438203 A | 10/2014 |
| TW | 201543654 A | 11/2015 |

* cited by examiner

US 11,237,048 B2

LIGHT SENSOR WITH A HIGH SENSITIVITY USING A SIGMA-DELTA ANALOG TO DIGITAL CONVERTER AND SENSING METHOD THEREOF

This application claims priority for Taiwan patent application no. 109124383 filed on 20 Jul. 2020, the content of which is incorporated by reference in its entirely.

BACKGROUND OF THE INVENTION

Field of the Invention

The present invention relates to a sensor, particularly to a light sensor and a sensing method thereof.

Description of the Prior Art

A mobile phone needs a light sensor to sense the ambient light so as to adjust the brightness of a screen of the mobile phone according to the intensity of the ambient light. A light sensor often uses a light sensing element to detect light and output a photo current. Then the light sensor determines the light intensity according to the photo current. Recently, the light sensor is disposed on the backside of the organic light-emitting diode (OLED) panel so as to increase the screen-to-body ratio. After the light penetrates the OLED panel, the intensity of the light will decrease, and the photo current acquired by the light sensor becomes very small. Thus, the light intensity is hard to determine precisely. The light sensor may acquire a larger current by increasing the exposure time (i.e. the measurement period) of the light sensor. However, as the frame rate of the OLED screen is growing higher and higher, the measurement period available for the light sensor is becoming shorter and shorter. Thus, how to detect the intensity of the ambient light precisely in such a limitation becomes a problem to overcome.

SUMMARY OF THE INVENTION

One objective of the present invention is to provide a light sensor and a light sensing method thereof.

Another objective of the present invention is to provide a light sensor having a better signal-to-noise ratio.

According to one embodiment, a light sensor of the present invention comprises a light sensing element, a first integrator, a sigma-delta ($\Sigma$-$\Delta$) analog-to-digital converter (ADC). The light sensing element senses light during a measurement period to generate a first current. The first integrator is coupled to the light sensing element and configured to receive the first current and generating a first integration signal. The sigma-delta analog-to-digital converter is coupled to the first integrator and configured to convert the first integration signal into a sensing value.

According to one embodiment, a light sensing method of the present invention comprises the steps of: sensing light during a measurement period to generate a first current; integrating the first current to generate a first integration signal; converting the first integration signal into a sensing value by a sigma-delta analog-to-digital converter.

The light sensor and the light sensing method of the present invention can accurately determine the light intensity during a short measurement period (such as 1 ms). Further, the sigma-delta analog-to-digital converter can decrease the noise in the first integration signal. Therefore, the light sensor of the present invention has a better signal-to-noise ratio.

DETAILED DESCRIPTION OF THE INVENTION

Figure 1:
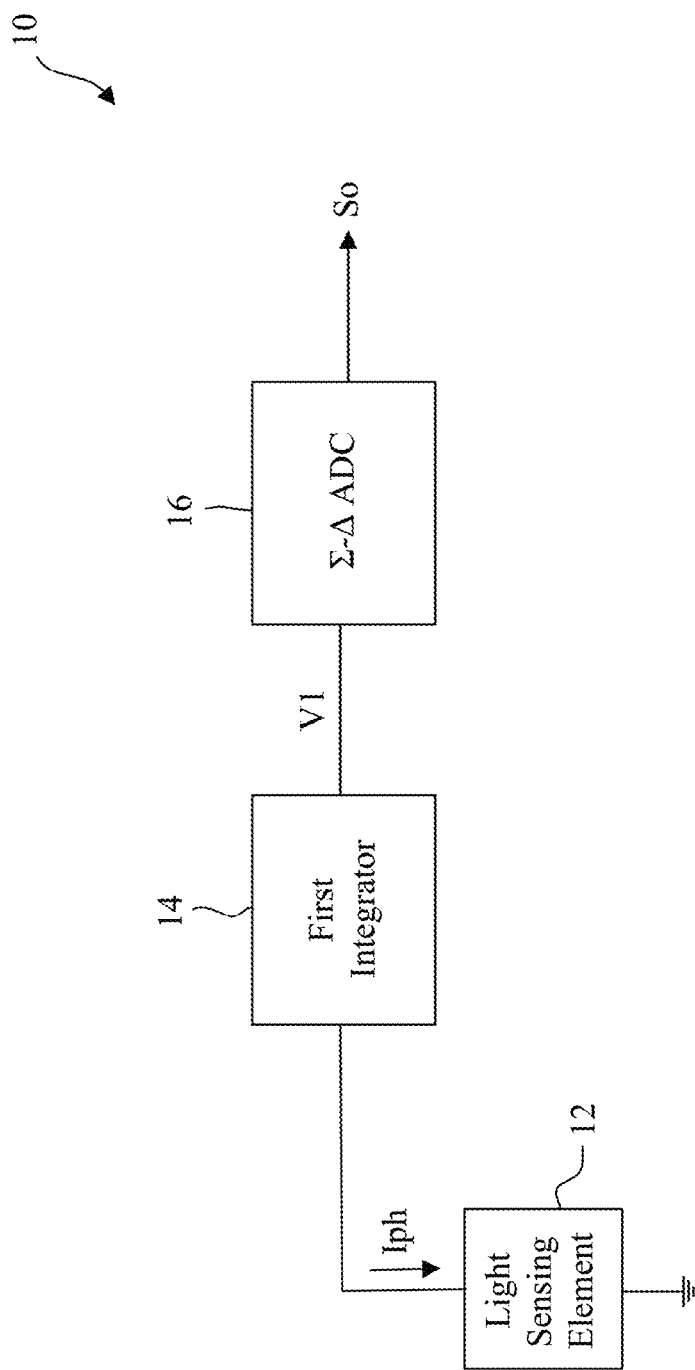
FIG. 1 schematically shows a light sensor according to one embodiment of the present invention.

FIG. 1 schematically shows a light sensor according to one embodiment of the present invention. In FIG. 1, the light sensor 10 comprises a light sensing element 12, a first integrator 14, a sigma-delta analog-to-digital converter ($\Sigma$-$\Delta$ ADC) 16. The light sensing element 12 senses ambient light during a measurement period (exposure period) T so as to generates a first current Iph. The first integrator 14 is coupled to the light sensing element 12 and integrates the first current Iph generated by the light sensing element 12 to generate a first integration signal V1. The sigma-delta analog-to-digital converter 16 is coupled to the first integrator 14 and converts the first integration signal V1 provided by the first integrator 14 into a sensing value So. The light sensor 10 may be disposed in a portable electronic device, such as a mobile phone or a tablet computer. The circuitry coupled to the light sensor 10 may determine the light intensity according to the sensing value So and then execute some operations, such as adjusting the brightness of the screen.

Figure 2:
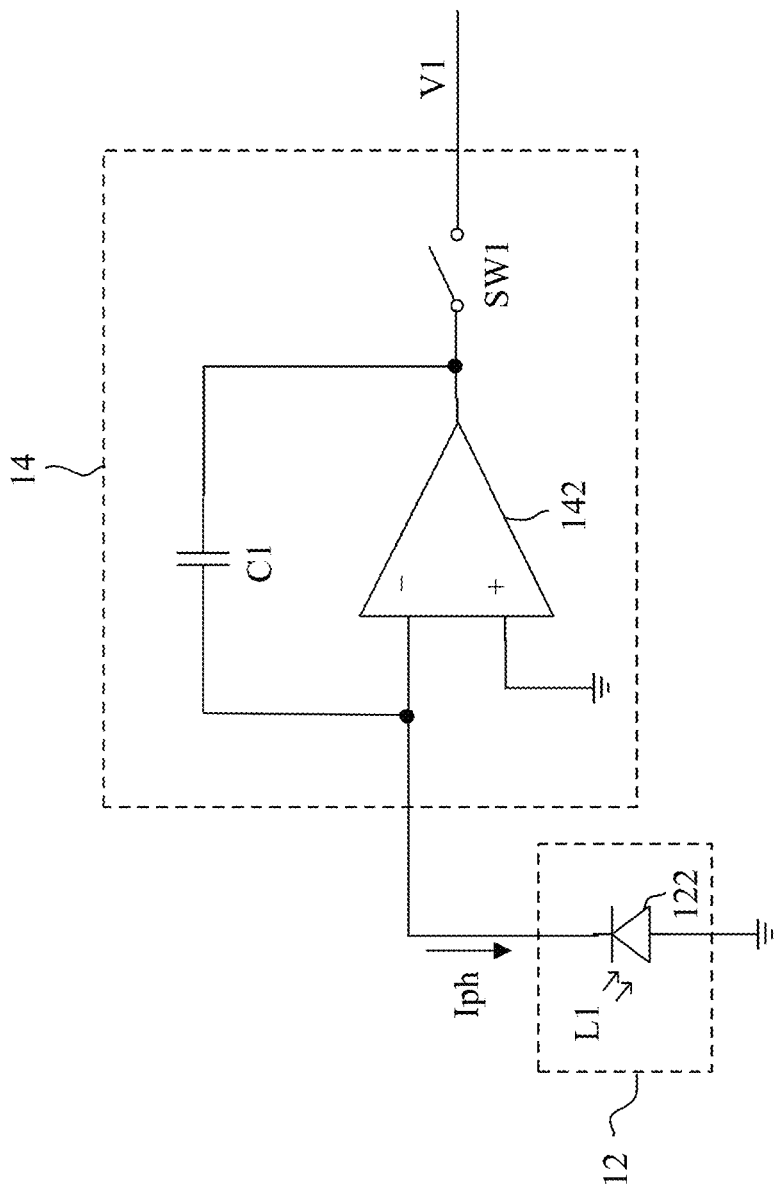
FIG. 2 schematically shows the light sensing element and the first integrator shown in FIG. 1 according to one embodiment of the present invention.

FIG. 2 schematically shows the light sensing element 12 and first integrator 14 according to one embodiment of the present invention. In FIG. 2, the light sensing element 12 is a photo diode. However, the present invention is not limited by the embodiment. The photo diode receives light L1 and generates the first current Iph. In FIG. 2, the first integrator 14 is a capacitive trans-impedance amplifier (CTIA). The first integrator 14 includes an operational amplifier 142, a capacitor C1, and a switch SW1. The operational amplifier 142 includes a non-inverting input terminal, an inverting input terminal, and an output terminal. The non-inverting input terminal is grounded, and the inverting input terminal is coupled to the light sensing element 12. The capacitor C1 is connected between the inverting input terminal and the output terminal of the operational amplifier 142. The combination of the capacitor C1 and the operational amplifier 142 integrates the first current Iph during the measurement period T to generate the first integration signal V1. The first integration signal V1 can be expressed as follows.

$$V1 = \frac{1}{C1}\int_0^T Iph \times dt$$
$$= \frac{Iph \times t}{C1}\bigg|_0^T$$
$$= \frac{Iph \times T}{C1}$$

The switch SW1 is connected between the output terminal of the operational amplifier 142 and the sigma-delta analog-to-digital converter 16. During the measurement period T in which the light sensor 12 senses the ambient light, the switch SW1 is turned on to let the first integrator 14 provide the first integration signal V1 to the sigma-delta analog-to-digital converter 16. After the measurement period T ends, the switch SW1 is turned off. In the embodiment shown in FIG. 2, the switch SW1 is arranged inside the first integrator 14. However, the present invention is not limited by the embodiment. The switch SW1 may be arranged outside the first integrator 14. For example, the switch SW1 may be arranged between the output terminal of the light sensor 12 and the first integrator 14 or between the first integrator 14 and the sigma-delta analog-to-digital converter 16. Alternatively, the switch SW1 may be arranged inside the sigma-delta analog-to-digital converter 16.

Figure 3:
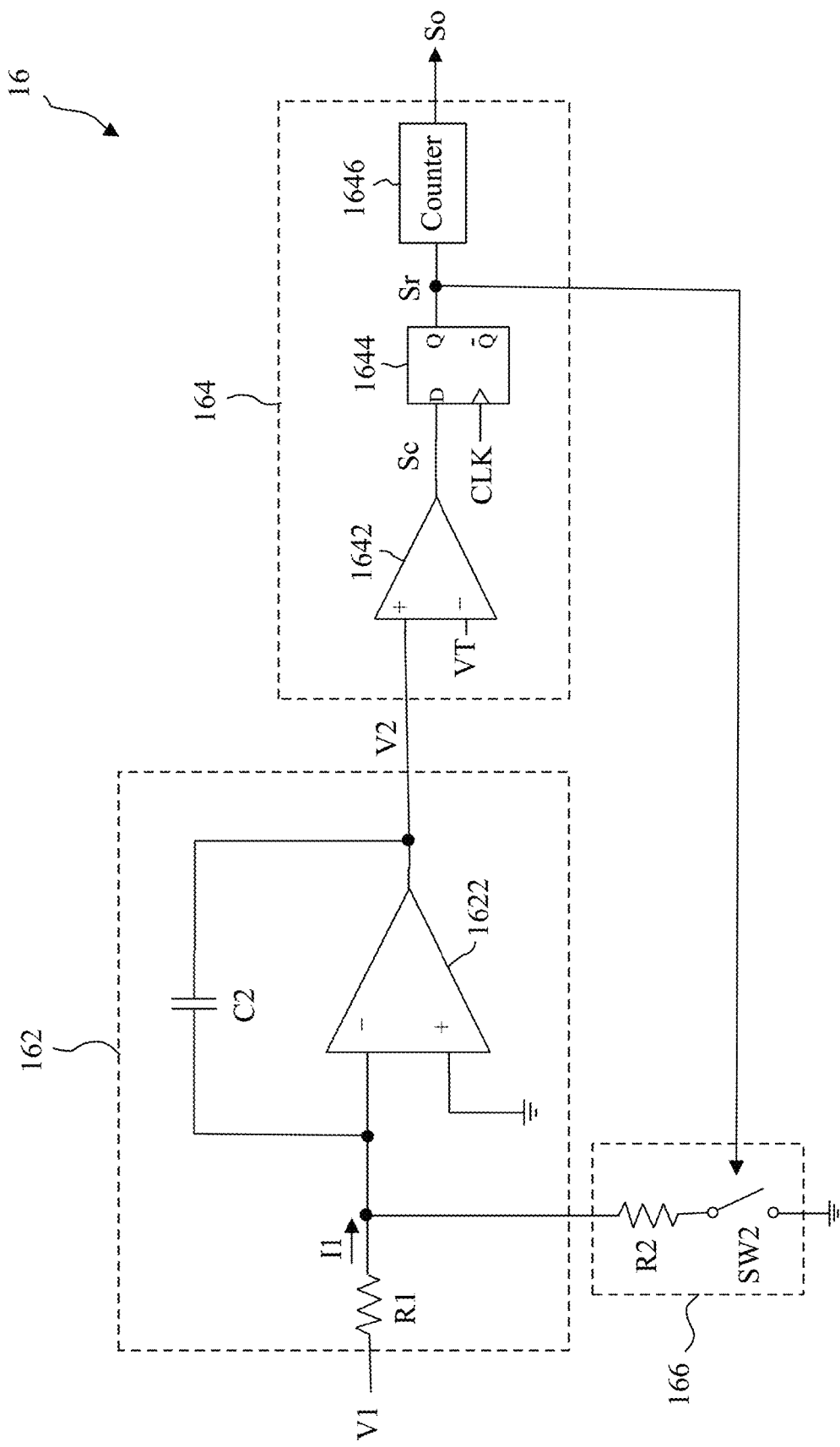
FIG. 3 schematically shows the sigma-delta analog-to-digital converter according to one embodiment of the present invention.

FIG. 3 schematically shows the sigma-delta analog-to-digital converter 16 according to one embodiment of the present invention, wherein a first-order sigma-delta analog-to-digital converter is used as an exemplification. However, the present invention is not limited by the embodiment shown in FIG. 3. In FIG. 3, the sigma-delta analog-to-digital converter 16 includes a second integrator 162, a quantizer 164, and a reset circuit 166. The second integrator 162 is coupled to the first integrator 14 and integrates the first integration signal V1 to generate a second integration signal V2. The second integrator 162 includes a resistor R1, a capacitor C2, and an operational amplifier 1622. The resistor R1 is connected between the first integrator 14 and an inverting input terminal of the operational amplifier 1622. The resistor R1 is configured to convert the first integration signal V1 into a current I1. The capacitor C2 is connected between the inverting input terminal of the operational amplifier 1622 and an output terminal of the operational amplifier 1622. A non-inverting input terminal of the operational amplifier 1622 is grounded. The combination of the capacitor C2 and the operational amplifier 1622 integrates the current I1 during the measurement period T to generate the second integration signal V2 which can be expressed as follows.

$$V2 = \frac{1}{C2} \int_0^T I1 \times dt$$

$$= \frac{1}{R1 \times C1} \int_0^T V1 \times dt$$

$$= \frac{Iph}{R1 \times C2 \times C1} \int_0^T t \times dt$$

$$= \frac{Iph}{2 \times R1 \times C2 \times C1} t^2 \Big|_0^T$$

$$= \frac{Iph \times T^2}{2 \times R1 \times C2 \times C1}$$

In the condition that the measurement period is 1 ms, the second integration signal V2 may be over 500 times the first current Iph by appropriately selecting the capacitor C1, the resistor R1 and the capacitor C2. Therefore, although the measurement period T is very short and the first current Iph is very small, the present invention can still precisely determine the intensity of the ambient light according to the first current Iph and generate the sensing value So.

The reset circuit 166 is coupled to the second integrator 162 and the quantizer 164. The reset circuit 166 is configured to reset the second integrator 162 to return the second integration signal V2 to zero. After being reset, the second integrator 162 integrates the first integration signal V1 again to newly generate the second integration signal V2. The reset circuit 166 includes a resistor R2 and a switch SW2. The resistor R2 and the switch SW2 are connected in series between the ground terminal and the inverting input terminal of the operational amplifier 1622. The switch SW2 is controlled to turn on or off by a reset signal Sr. While the switch SW2 is turned on, the inverting input terminal of the operational amplifier 1622 is grounded to reduce the second integration signal V2 to zero.

The quantizer 164 is coupled to the second integrator 162 and the reset circuit 166. While the second integration signal V2 is greater than a preset value VT, the quantizer 164 makes the reset circuit 166 reset the second integrator 162. The quantizer 164 also counts the times that the second integration signal V2 is greater than the preset value VT during the measurement period T so as to generate the sensing value So. In the embodiment shown in FIG. 3, the quantizer 164 includes a comparator 1642, a flip-flop 1644, and a counter 1646. However, the present invention is not limited by the embodiment. The comparator 1642 is coupled to the second integrator 162 and is configured to compare the second integration signal V2 with the preset value VT to generate a comparison signal Sc. While the second integration signal V2 is greater than the preset value VT, the comparison signal is "1". The flip-flop 1644 is coupled to the comparator 1642. The flip-flop 1644 generates a reset signal Sr according to the comparison signal Sc to control the reset circuit 166. In the embodiment shown in FIG. 3, an output of an output terminal Q of the flip-flop 1644 is used as the reset signal. While the comparison signal is "1", the output of the output terminal Q is "1". Thus, the switch SW2 of the reset circuit 166 is turned on. The counter 1646 is coupled to the flip-flop 1644 and generates the sensing value So according to the output (i.e. the reset signal Sr) of the output terminal Q of the flip-flop 1644. The counter 1646 counts the times that the output of the flip-flop 1644 is "1" during the measurement T to generate the sensing value So. In other words, it can be understood as that the counter 1646 counts the times that the second integration signal V2 is greater than the preset value VT during the measurement period T to generate the sensing value So.

Figure 4:
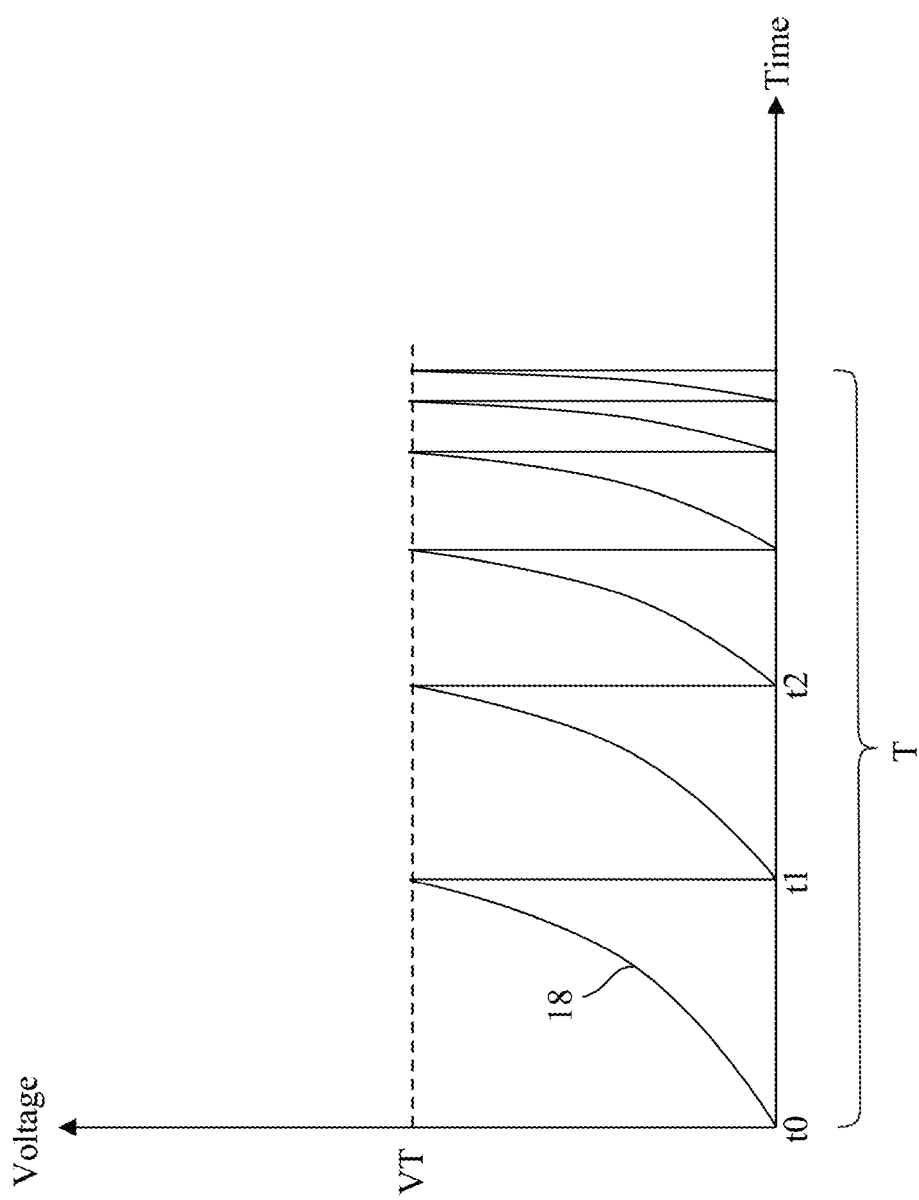
FIG. 4 shows a waveform of the second integration signal V2 in FIG. 3.

While the light sensor 10 is sensing the ambient light, the variation of the second integration signal V2 is shown as a waveform 18 in FIG. 4. In the interval from t0 to t1, the second integration signal V2 increases gradually. At the time point t1, the second integration signal V2 exceeds the preset value VT, and the reset signal Sr becomes "1". Thus, the second integrator 162 is reset, and the second integration signal V2 is returned to zero. After resetting, the second integrator 162 integrates the first integration signal V1 again. At the time point t2, the second integration signal V2 rises to the preset value VT again. The second integration signal V2 will be increased and then returned to zero repeatedly until the measurement period T is over. The first integration signal V1 rises over time. Therefore, as time go on, the second integration signal V2 rises faster and faster and the interval, in which the second integration signal V2 is zeroed and then increased to the preset value VT, becomes shorter and shorter.

In the embodiment shown in FIG. 3, the preset value VT is set to be lower than the saturation voltage of the second integrator 162 lest the second integration signal V2 exceed the saturation voltage of the second integrator 162.

The light sensor 10 of the present invention amplifies the first current Iph in two stages by the first integrator 14 and the second integrator 162, so as to generate the second integration signal V2. Therefore, the light sensor 10 can acquire a second integration signal V2 which is large sufficiently to determine the light intensity in a very short measurement period T (such as 1 ms). Consequently, the light sensor 10 of the present invention has higher sensitivity.

Besides, the second integrator 162 of the present invention can lower the noise in the first integration signal V1. Therefore, the signal-to-noise ratio of the light sensor 10 is increased.

The embodiments have been described above to demonstrate the principles of the present invention and enable the persons skilled in the art to understand, make, and use the present invention. However, these embodiments are only to exemplify the present invention but not to limit the scope of the present invention. The technical thought and scope of the present invention is defined by the claims stated below and the equivalents thereof. Any modification or variation according to the principle, spirit or embodiment of the present invention is to be also included by the scope of the present invention.

What is claimed is:

1. A light sensor, comprising:
   a light sensing element, configured to sense light during a measurement period to generate a first current;
   a first integrator, coupled to said light sensing element, configured to receive said first current and generate a first integration signal; and
   a sigma-delta analog-to-digital converter, coupled to said first integrator, configured to convert said first integration signal into a sensing value, wherein said sigma-delta analog-to-digital converter comprises:
      a second integrator, coupled to said first integrator, configured to generate a second integration signal according to said first integration signal;
      a reset circuit, coupled to said second integrator, configured to reset said second integrator; and
      a quantizer, coupled to said second integrator and said reset circuit, configured to make said reset circuit reset said second integrator while said second integration signal is greater than a preset value, and count times that said second integration signal is greater than said preset value during said measurement period, whereby to generate said sensing value.

2. The light sensor according to claim 1, wherein said light sensing element includes a photo diode.

3. The light sensor according to claim 1, wherein said first integrator includes a capacitive trans-impedance amplifier.

4. The light sensor according to claim 1, wherein said quantizer comprises:
   a comparator, coupled to said second integrator, configured to compare said second integration signal with said preset value to generate a comparison signal;
   a flip-flop, coupled to said comparator, configured to generate a reset signal to control said reset circuit according to said comparison signal;
   a counter, coupled to said flip-flop, configured to generate said sensing value according to said reset signal.

5. The light sensor according to claim 1, wherein said preset value is lower than a saturation voltage of said second integrator.

6. The light sensor according to claim 1, wherein said measurement period is 1 ms.

7. A light sensing method, comprising the steps of:
   A. sensing light during a measurement period to generate a first current;
   B. integrating said first current to generate a first integration signal; and
   C. converting said first integration signal into a sensing value by a sigma-delta analog-to-digital converter;
   wherein said step C further comprises:
   C1. integrating first integration signal to generate a second integration signal;
   C2. while said second integration signal is greater than a preset value, returning said second integration signal to zero, and returning to step C1; and
   C3. counting times that said second integration signal is greater than said preset value whereby to generate said sensing value.

8. The light sensing method according to claim 7, wherein said step B includes integrating said first current by a capacitive trans-impedance amplifier.

9. The light sensing method according to claim 7, wherein said step C1 includes integrating said first integration signal by a second integration circuit, wherein said preset value is smaller than a saturation voltage of said second integration circuit.

10. The light sensing method according to claim 7 further comprising a step of setting said measurement period to be 1 ms.

* * * * *